(12) United States Patent
Chefd'hotel et al.

(10) Patent No.: US 7,483,034 B2
(45) Date of Patent: Jan. 27, 2009

(54) SYSTEM AND METHOD FOR GPU-BASED 3D NONRIGID REGISTRATION

(75) Inventors: Christophe Chefd'hotel, Princeton, NJ (US); Kinda Anna Saddi, Hamilton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 654 days.

(21) Appl. No.: 11/062,962

(22) Filed: Feb. 22, 2005

(65) Prior Publication Data

US 2005/0190189 A1 Sep. 1, 2005

Related U.S. Application Data

(60) Provisional application No. 60/547,684, filed on Feb. 25, 2004.

(51) Int. Cl.
G09G 5/00 (2006.01)
(52) U.S. Cl. ............... 345/582; 345/646; 382/294; 382/295; 382/300
(58) Field of Classification Search ........ 345/582, 345/646; 382/300, 294–295
See application file for complete search history.

(56) References Cited

U.S. PATENT DOCUMENTS 6,633,686 B1 * 10/2003 Bakircioglu et al. ........ 382/294

7,120,276 B1 * 10/2006 Brady et al. ................ 382/107

OTHER PUBLICATIONS

"Iterative Multigrid Regularization Techniques for Image Matching", Henn et al., SIAM J. Sci. Comput. vol. 23, No. 4, p. 1077-1093, 2001.*
"Towards fast non-rigid registration", Clarenz et al., Comtemporary Mathematics, Special Issue on Inverse Problems and Image Analysis, p. 1-18, 2002.*
R. Strzodka, M. Droske, and M. Rumpf: "Fast image registration in DX9 graphics hardware" Journal of Medical Informatics and Technoloiges, 6: 43-49, Nov. 2003.
B. Horn, M. Brooks: "The Variational Approach to Shape from Shading" Computer Vision Graphics, and Image Processing 33, pp. 174-208 (1986).

* cited by examiner

Primary Examiner—Kee M Tung
Assistant Examiner—Jwalant Amin
(74) Attorney, Agent, or Firm—Donald B. Paschburg; F. Chau & Associates, LLC (57) ABSTRACT

A method of registering two images using a graphics processing unit includes providing a pair of images with a first and second image, calculating a gradient of the second image, initializing a displacement field on the grid point domain of the pair of images, generating textures for the first image, the second image, the gradient, and the displacement field, and loading said textures into the graphics processing unit. A pixel buffer is created and initialized with the texture containing the displacement field. The displacement field is updated from the first image, the second image, and the gradient for one or more iterations in one or more rendering passes performed by the graphics processing unit.

22 Claims, 5 Drawing Sheets

SYSTEM AND METHOD FOR GPU-BASED 3D NONRIGID REGISTRATION

CROSS REFERENCE TO RELATED UNITED STATES APPLICATIONS

This application claims priority from "GPU-Based 3D Nonrigid Registration", U.S. Provisional Application No. 60/547,684 of Chefd'hotel, et al., filed Feb. 25, 2004, the contents of which are incorporated herein by reference.

TECHNICAL FIELD

This invention relates to methods and systems for 3D nonrigid registration in medical image processing.

DISCUSSION OF THE RELATED ART

Nonrigid image registration is a challenging and fundamental problem in medical image processing. It consists in finding a displacement field between two or more images that aligns them according to some similarity measure. Registration algorithms generally have high computational costs and require large amount of memory, in particular when working with volumes.

Image registration aims to spatially align one image to another. For that purpose, parameters of a global transformation model, such as rigid, affine or projective, are to be recovered to geometrically transform a moving image to achieve high spatial correspondence with a fixed image. The problem has been studied in various contexts due to its significance in a wide range of areas, including medical image fusion, remote sensing, recognition, tracking, mosaicing, and so on.

Computer graphics hardware is advancing at a rapid rate. Recent graphics hardware has become more powerful and supports programmable elements. In 2002, NVIDIA introduced a new generation of graphics processing units (GPUs), the GeForce FX family. These GPUs provide vertex and fragment programmability. These features provide the possibility to load complex vertex transformation and pixel-shading operations from the CPU to the GPU. In fact, the parallelism of the graphics pipeline makes this type of architecture a perfect candidate to perform many general-purpose computational tasks.

Figure 3:
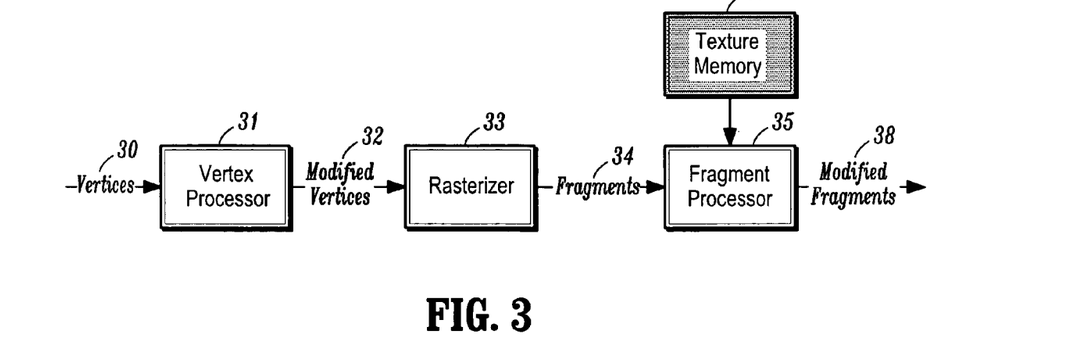
FIG. 3 is a block diagram of a graphics pipeline in a GPU, according to an embodiment of the invention.

A graphics processing unit typically includes a pipeline organized in a sequence of transformations, clipping and rasterization phases. The latest graphics hardware offers programmable features in this pipeline. It is composed of a programmable vertex processor, rasterizer and programmable fragment processor, as shown in FIG. 3. A 3D application, which is executing on the CPU, sends to the GPU a sequence of vertices 30 batched into geometric primitives. Every vertex has a position and several other attributes, like color and texture coordinates. The vertex processor 31 performs some operations on each vertex, transforming the vertex position into a screen position, generating texture coordinates, and lighting the vertex to determine its color. The transformed vertices 32 flow to the next stage 33, called rasterization. Each output by the rasterizer is called a fragment. The rasterization process linearly interpolates attributes, such as texture coordinates, stored at the vertices and stores the interpolated values in each fragment. These fragments 34 are sent to the fragment processor 35, which performs the same type of mathematical operations as the vertex processor, but which also supports texturing operations. The fragment processor uses the interpolated texture coordinates sent by rasterizer to lookup texture values from texture memory 37. The output 38 of the fragment processor are updated pixels, which can then be sent to either the frame buffer or the pixel buffer.

SUMMARY OF THE INVENTION

Exemplary embodiments of the invention as described herein generally include methods and systems accelerating non-rigid medical image registration using a graphics processing unit (GPU) and programmable features available on the graphics hardware to implement a PDE-based three-dimensional non-rigid registration.

In an aspect of the invention, there is provided a method of registering two images using a graphics processing unit, including providing a pair of images with a first image and a second image, wherein said images comprise a plurality of intensities corresponding to a domain of grid points in a D-dimensional space, calculating a gradient of the second image, initializing a displacement field on the grid point domain of the pair of images, wherein said displacement field transforms said second image into said first image, generating textures for the first image, the second image, the gradient, and the displacement field, and loading said textures into the graphics processing unit, creating a pixel buffer and initializing it with the texture containing the displacement field, smoothing the displacement field, updating the displacement field from the first image, the second image, and the gradient for one or more iterations, and reading the updated displacement field from the pixel buffer.

In a further aspect of the invention, creating a pixel buffer further comprises creating a rendering context, initializing the pixel buffer attributes, and generating a new texture where the pixel buffer is bound.

In a further aspect of the invention, the method further comprises setting texture parameters, and setting uniform variables.

In a further aspect of the invention, the method further comprises creating a rendering context for the image registration, and compiling and loading fragment programs for updating the displacement field into the graphics processing unit.

In a further aspect of the invention, the method further comprises expanding the resolution of the displacement field after reading the displacement field from the pixel buffer.

In a further aspect of the invention, expanding the resolution includes linearly interpolating displacement field values for points between grid points in the displacement field domain.

In a further aspect of the invention, updating of the displacement field is a rendering pass performed by the graphics processing unit according to the equation $$u_{k+1} = u_k + \delta[(I_1 - I_2 \circ (Id + u_k))\nabla I_2 \circ (Id + u_k)] + \alpha \Delta u_k,$$

wherein $u_k$ and $u_{k+1}$ are the displacement field and updated displacement field, respectively, $I_1$ is the first image, $I_2$ is the second image, $\nabla I_2$ is the gradient, $Id$ is the identity map, $\Delta u_k$ is the Laplacian of the displacement field, $\alpha$ is a regularization parameter, and $\delta$ is the time step.

In a further aspect of the invention, the domain of grid points is a 3-dimensional space, and wherein the displacement field is converted from 3 dimensions to 2 dimensions for the rendering pass according to the transformations $$p = R_x \times \mathrm{mod}\left(\frac{z}{N}\right) + x$$

-continued $$q = R_y \times \text{fix}\left(\frac{z}{N}\right) + y,$$

wherein fix is the quotient of an integer division, mod is the remainder of an integer division, (x, y, z) is a 3-dimensional grid point, (p, q) is a 2-dimensional grid point, $R_x$ is the number of columns, $R_y$ is the number of rows, and N is an integer defined as $N=\sqrt{R_z}$, if the result is an integer, $N=\sqrt{2 \times R_z}$, otherwise.

In a further aspect of the invention, the displacement field is converted from a 2-dimensional grid to a 3-dimensional grid according to the transformations $$x = \text{mod}\left(\frac{p}{R_x}\right)$$

$$y = \text{mod}\left(\frac{q}{R_y}\right)$$

$$z = \text{fix}\left(\frac{p}{R_x}\right) + N \times \text{fix}\left(\frac{q}{R_y}\right),$$

wherein $R_z$ is the number of slices.

In a further aspect of the invention, the Laplacian of the displacement field $u_k$ is defined in 3-dimensions as $$\Delta u_k(x,y,z) = u_k(x+1,y,z) + u_k(x-1,y,z) + u_k(x,y+1,z) + u_k(x,y-1,z) + u_k(x,y,z+1) + u_k(x,y,z-1) - 6.0 \times u_k(x,y,x),$$

and in 2-dimensions as $$\Delta u_k(p,q) = u_k(p+1,q) + u_k(p-1,q) + u_k(p,q+1) + u_k(p,q-1) + u_k(r,s) + u_k(t,u) - 6.0 \times u_k(p,q),$$

wherein (x, y, z) is a 3-dimensional grid point, (p, q) is a 2-dimensional grid point, $R_x$ is the number of columns, $R_y$ is the number of rows, $R_z$ is the number of slices, and N is an integer defined as $N=\sqrt{R_z}$, if the result is an integer, $N=\sqrt{2 \times R_z}$, otherwise, $$p = R_x \times \text{mod}\left(\frac{z}{N}\right) + x$$

$$q = R_y \times \text{fix}\left(\frac{z}{N}\right) + y,$$

$$r = \text{mod}\left(\frac{x + R_x}{N \times R_x}\right),$$

$$s = y + R_y \times \text{fix}\left(\frac{x + R_x}{N \times R_x}\right),$$

$$t = \text{mod}\left(\frac{x - R_x + N \times R_x}{N \times R_x}\right),$$

$$u = y + R_y \times \text{fix}\left(\frac{x - R_x}{N \times R_x}\right),$$

wherein fix is the quotient of an integer division and mod is the remainder of an integer division.

In a further aspect of the invention, the boundary conditions of the 3-dimensional displacement field are clamp-to-edge, and further comprising controlling said boundary conditions of the 2-D displacement field by imposing a 2D mask, wherein said mask is a precomputed vector comprising 7 coefficients (a,b,c,d,e,f,g) that multiply each term of the displacement field according to the equation, $$a \times u_k(x+1,y) + b \times u_k(x-1,y) + c \times u_k(x,y+1) + d \times u_k(x,y-1) + e \times u_k(r,s) + f \times u_k(t,u) + g \times u_k(x,y)$$

wherein $u_k(x,y)$ is the 2D displacement field, (a,b,c,d,e,f) are either 0 or 1, wherein 0 indicates a displacement field value outside the boundary, and 1 a point inside the boundary, g can vary between −6 and 0 depending on the number of nearest neighbor interior points about (x,y).

In another aspect of the invention there is provided a program storage device readable by a computer, tangibly embodying a program of instructions executable by the computer to perform the method steps for registering two images using a graphics processing unit.

DETAILED DESCRIPTION OF THE PREFERRED EMBODIMENTS

Exemplary embodiments of the invention as described herein generally include systems and methods for GPU-based acceleration of non-rigid registration. In the interest of clarity, not all features of an actual implementation which are well known to those of skill in the art are described in detail herein.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Given a target image $I_1: \Omega \subset R^3 \mapsto R$ and a floating image $I_2: \Omega \subset R^3 \mapsto R$, the process of registration includes finding a transformation $\Phi: \Omega \mapsto \Omega$ between the 3D image domains such that $I_1 \approx I_2 \circ \Phi$. Note that the product here is a composition of mappings, in that the transformed $I_2$ is a function of the transformed domain $\Phi$. It is sometimes more convenient to determine a displacement field u, where $\Phi = Id + u$, where Id represents the identity map. Assuming the images have the same modality, the idea is to maximize their similarity by minimizing the sum of squared differences (SSD) between their intensities. In order to rule out discontinuous solutions, a regularizing term can be used. In particular the following energy functional is minimized:

$$E[u] = \frac{1}{2} \int_\Omega (I_1 - I_2 \circ (Id + u))^2 \, d\Omega + \alpha \int_\Omega \|Du\|^2 \, d\Omega,$$

using a gradient descent method. The calculus of variations is applied to this functional to obtain the following Euler-Lagrange equation:

$$\frac{\partial u}{\partial t} = [I_1 - I_2 \circ (Id + u)] \nabla I_2 \circ (Id + u) + \alpha \Delta u.$$

The corresponding gradient flow is a nonlinear partial differential equation (PDE). The first term corresponds to the derivative of the similarity measure. Note that it includes the gradient of the warped floating image, a vector that is perpendicular to the edges. The derivative of the regularizing term yields the Laplacian of the displacement field u. The coefficient $\alpha$ can be used to adjust the trade-off between the similarity constraint and the smoothness of the displacement field.

A differential operator can be approximated by a finite differences scheme. In order to numerically approximate this equation, it is discretized in time, with a time step $\delta$, and in space using the image sampling grid, to obtain:

$$\frac{u_{k+1} - u_k}{\delta} = (I_1 - I_2 \circ (Id + u_k)) \nabla I_2 \circ (Id + u_k) + \alpha \Delta u_k.$$

This expression results in the following iterative procedure:

$$u_{k+1} = u_k + \delta[(I_1 - I_2 \circ (Id + u_k)) \nabla I_2 \circ (Id + u_k)] + \alpha \Delta u_k,$$

where k is the number of iteration that makes the algorithm converge. In this equation, $I_1$ is the target image, $I_2$ is the floating image and $\nabla I_2$ is the gradient of the floating image. $I_1$ and $I_2$ are three-dimensional medical input datasets, $\nabla I_2$ can be easily calculated, and $u_{k+1}$ is the displacement field found after k iterations. $\nabla I_2$ and $u_{k+1}$ are three-dimensional datasets where each component is a 3D vector.

Figure 1:
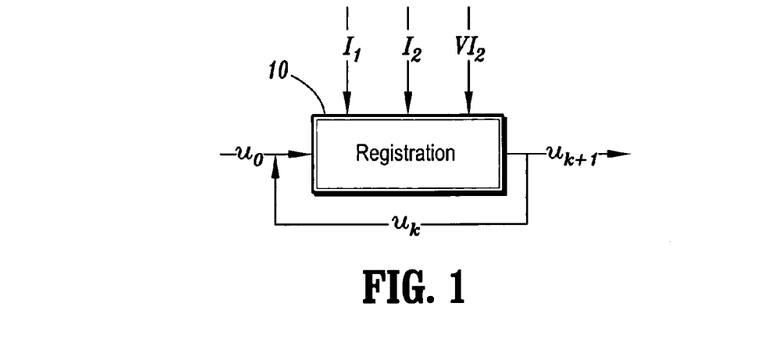
FIG. 1 is a block diagram of the registration process, according to an embodiment of the invention.

Referring now to FIG. 1, box 10 represents the iterative update function from the above equation that takes $u_k$ as an input, and outputs an updated $u_{k+1}$ as an output based on the images $I_1$, $I_2$, and the gradient of $I_2$. The iterations are repeated until successive iterations of $u_k$, $u_{k+1}$ are sufficiently close. The algorithm can be started by setting the initial displacement field $u_0$ to zero. $\delta$ and $\alpha$ can be chosen in order to ensure the convergence of the registration algorithm.

Figure 2:
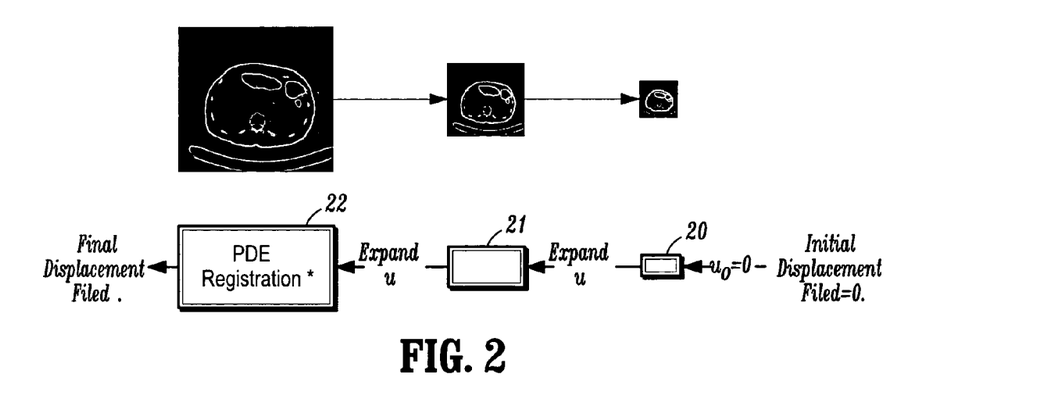
FIG. 2 is a block diagram of a multi-resolution approach to image registration, according to an embodiment of the invention.

The previous iterative algorithm can be combined with a coarse-to-fine strategy to reduce the computational cost by working with fewer data at lower resolution. This combination can also allow registration procedure to recover much larger displacements (improved capture range), and to avoid local minima. First, a displacement field is found at a low resolution, and then it is expanded and used as the initial displacement field $u_0$ for the next level. This resolution expansion is illustrated in FIG. 2. An initial, low resolution image is found at box 20 by averaging the data from the initial images. Displacement fields are expanded using a (tri-)linear interpolation and then smoothed to reduce discontinuities. Referring to FIG. 2, two expansion steps are depicted, yielding an intermediate expanded displacement field 21, and a final displacement field 22. The two expansion steps depicted here are for illustrative purposes only, and more or fewer expansion steps are within the scope of the invention.

According to an embodiment of the present invention, in order to use the graphics pipeline provided by a GPU, OpenGL (Open Graphics Library), a standard 3D programming interface, can be used. The purpose of OpenGL is to communicate rendering commands to the GPU. OpenGL was introduced in 1992 by SGI (Silicon Graphics), and is a free and open graphics application programming interface (API) for 2D and 3D applications. OpenGL is designed for the C programming language. In addition to OpenGL, the Cg language can be used for programming graphics hardware. Cg is C for Graphics, a high-level language for graphics programming, and was developed by NVIDIA in collaboration with Microsoft. It replaces assembly code with a C-like language and has compiler that generates assembly code for the GPU. Vertex and fragment programs are the programs generated by Cg to program the graphics processors. Cg Runtime is a software interface that simplifies parameter passing from the application running on the CPU to the vertex and fragment programs running on the GPU. It compiles Cg code and passes it to the GPU.

Figure 4:
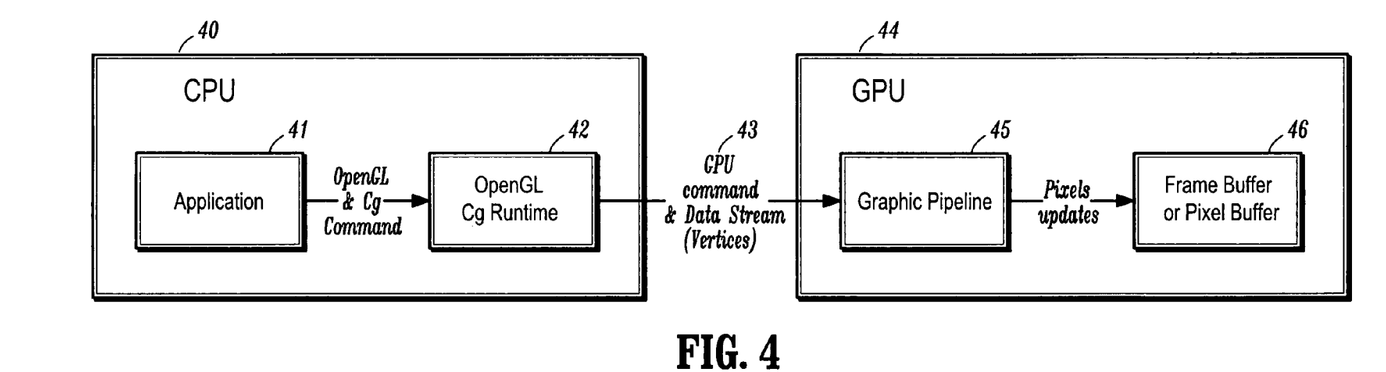
FIG. 4 is a block diagram of a system architecture of a CPU connected to a GPU, according to an embodiment of the invention.

A block diagram of the architecture of a system including a CPU connected to a GPU is depicted in FIG. 4. Referring now to FIG. 4, a main application 41 running on CPU 40 uses OpenGL and CG functions. These functions are compiled by Cg Runtime 42 into GPU commands and data 43, which is sent to the GPU 44. These commands 43 are processed by the graphics pipeline 45 into pixel updates that are then stored in then frame or pixel buffers 46 for display.

OpenGL uses a rendering context to remember drawing modes and commands. Multiple rendering contexts are allowed in the same application. Different textures and different buffers can be associated to a specific rendering context. According to an embodiment of the invention, two different rendering contexts are used. First, an on-screen rendering context is associated with the frame buffer, which initializes Cg programs and textures. Second, an off-screen rendering context is associated with a pixel buffer. Since these rendering contexts will use the same textures, the textures can be shared between the contexts.

A texture is usually thought as being two-dimensional, like most images, but it can also be one-dimensional or three-dimensional. According to an embodiment of the present invention, a three-dimensional texture is used to represent a series of layered images such as those produced by computed tomography (CT) or magnetic resonance imaging (MRI). Textures are simply arrays of data, such as color data (RGB), luminance data, color and alpha data (RGBA), etc. The individual values in a texture array are called texels. Thus, the data describing a texture can consist of one, two, three or four elements per texel, from a modulation constant to a RGBA quadruple. Textures can be stored on the GPU memory, and can be easily accessed by a fragment program, avoiding the transfer of data from the CPU to the GPU memory over the system bus, which can act as a bottleneck.

Figure 5:
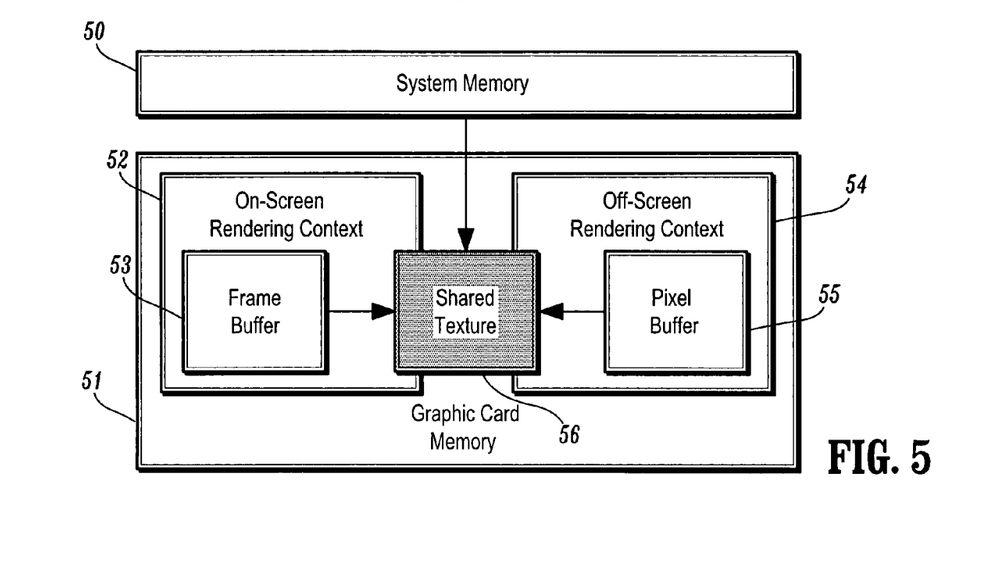
FIG. 5 is a block diagram of a graphics card memory, according to an embodiment of the invention.

An off-screen buffer can be used to perform rendering passes without transferring the content of the frame buffer to the display device immediately after each pass. OpenGL offers the ability to render to an off-screen buffer, also known as pixel buffer or Pbuffer. This process of rendering to the Pbuffer is accelerated in the hardware, because it is located on the GPU memory of the graphics card. The pixel buffer is very useful for a rendering to a texture. First, because the size of the texture is not limited to the current window size. Second, because the data generated by the GPU is kept in the GPU memory, eliminating the need to transfer this data over the system bus. This technique of rendering to the Pbuffer is referred to as Render-To-Texture, and is illustrated in FIG. 5. As shown in FIG. 5, system memory 50, such as RAM associated with the CPU, is connected to graphic card memory 51, which contains a shared texture 56 that can be initialized from the system memory 50. The graphic card memory 51 includes an on-screen rendering context 52 with a frame buffer 53, and an off-screen rendering context 54 with a pixel buffer 55. As indicated in the figure, the shared texture 56 can be updated from either the frame buffer 53 or the pixel buffer 55.

OpenGL supports floating point values for 2D and 3D textures. But these float values are clamped to be between 0.0 and 1.0. In addition, textures dimensions are restricted to dimensions of the form $2^u \times 2^v$ for 2D textures, and $2^u \times 2^v \times 2^w$ for 3D textures, where u, v, and w must each be a non-negative integer. The NVIDIA SDK extension removed these restriction for 2D texture, by creating a 2D rectangular texture with floating-point values having any dimension. However, in this case, there is no linear interpolation applied on the texture when looking up a value in the texture. The restrictions on floating point values and the array dimensions still apply for 3D texture in the current hardware.

In the current graphics card, memory is limited to 256 MB, and the maximum size of the Pbuffer is 2048×2048. This means that the registration can be realized on a current GPU for volume sizes of $128^3$ voxels or less. As GPUs become available with increased memory, GPU based registration can be performed for larger image volume sizes.

According to an embodiment of the invention, in order to map an iterative equation as illustrated by FIG. 1 into the graphics processing unit, each iteration of the registration can be associated with one rendering pass on the GPU. The fragment processor can be programmed to implement the iteration step of the registration algorithm. Since $I_1$, $I_2$ and $\nabla I_2$ are fixed at a given resolution, these volumes can be pre-computed and stored in the texture memory. The displacement field $u_{k+1}$ can be updated after each iteration using the Render-To-Texture technique. The field $u_{k+1}$ is rendered into the pixel puffer, which is bound to a texture and reused for the next iteration.

Figure 6:
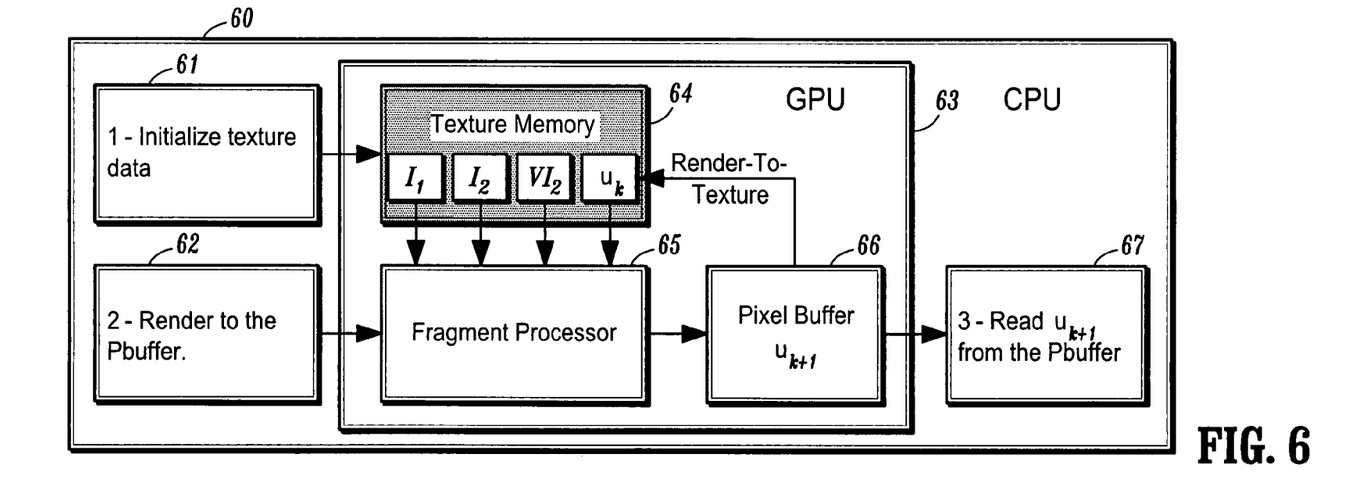
FIG. 6 is a block diagram of a system for implementing a GPU based image registration, according to an embodiment of the invention.

FIG. 6 is a block diagram of a system architecture supporting these operations, according to an embodiment of the invention. Initialized data 61 for the image volumes $I_1$, $I_2$, and $\nabla I_2$ is sent by CPU 60 to the texture memory 64 of GPU 63, while the initial displacement field $u_0$ 62 is rendered to the Pbudder 66 by the fragment processor 65, where it is updated according the equation of FIG. 1 as a function of the image volumes $I_1$, $I_2$, and $\nabla I_2$. The updated displacement field is also stored in the texture memory 64, where it is available for the next update by the fragment processor 65. When the iteration procedure has converged sufficiently, the final displacement field 67 is read from the Pbuffer 66 by the CPU 60.

Figure 8:
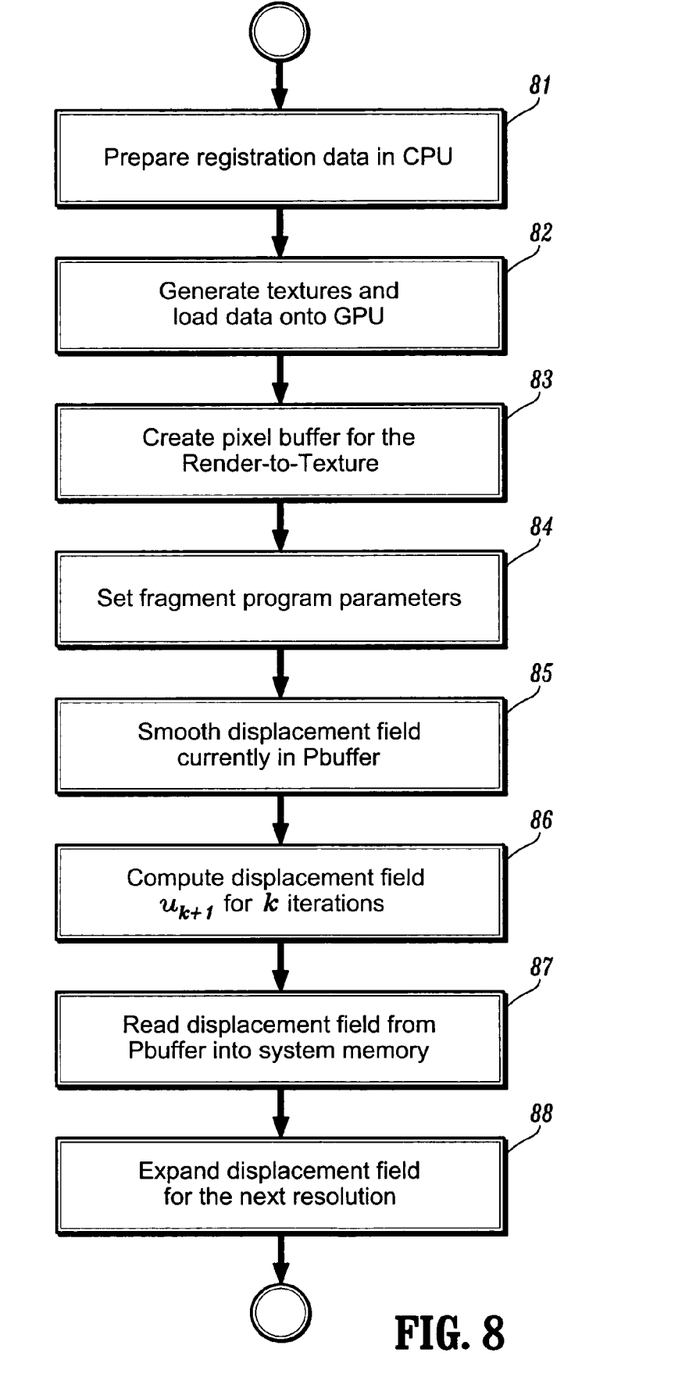
FIG. 8 is a flow chart of a GPU based registration algorithm, according to an embodiment of the invention.

A GPU implementation of a non-rigid registration algorithm according to an embodiment of the invention is illustrated by the flow chart of FIG. 8. However, prior to performing the registration, a rendering context for the registration application should be created in order to load textures into graphics memory and to create Cg contexts and programs. In addition, the fragment programs should be compiled and loaded onto the GPU. Referring now to FIG. 8, registration data is prepared in the CPU at step 81. This preparation includes loading the target and floating volumes, $I_1$ and $I_2$, calculating the gradient of the floating volume, $\nabla I_2$, and either initializing the displacement field $u_0=0$ or using a previously calculated displacement field $u_{k+1}$ found at a lower resolution. At step 82, the four textures generated and the data is loaded into the GPU. At step 83, the pixel buffer is created for the Render-To-Texture. This includes creating a new rendering context, initializing the Pbuffer attributes, generating a new texture where the Pbuffer is bound, and initializing the Pbuffer with the texture containing $u_0$ (or $u_{k+1}$). Pbuffer attributes include Pbuffer properties, such as the number of bits used per R/G/B/Alpha component and a flag indicating if the Pbuffer can also be used as a texture. According to an embodiment of the invention, 32 bit floating point components are used. Next, at step 84, the fragment program parameters are set, including the textures parameters and the uniform variables. Texture parameters include the names of the graphics hardware memory buffers needed by the fragment programs, such as the textures containing $I_1$, $I_2$, $\nabla I_2$, and $u_k$. The uniform variables include such parameters as the time step $\delta$ and the regularization parameter $\alpha$. At step 85, the displacement field currently in the Pbuffer is smoothed. At step 86, the displacement field $u_{k+1}$ is computed for k iterations. Once a predetermined criteria for convergence is satisfied, the displacement field is read from the Pbuffer into system memory at step 87. Then, at step 88, the displacement field is expanded in the CPU for the next resolution.

As previously mentioned, image intensity and gradient volumes are stored in the texture memory. Since a GPU is typically designed for representing RGB values in a 2D display, its memory has components for storing luminance information as well as color values. According to an embodiment of the invention, image intensities, which are scalar values, can be stored using a single unsigned short luminance component, while the gradient, which has three component values for each grid point, can be stored using the floating point RGB components. A linear interpolation method is used for expanding the displacement field, where values outside of grid points are calculated, while a tri-linear interpolation is applied when accessing texel values.

The displacement field is updated by performing an off-screen rendering pass into the pixel buffer. However, since a rendering pass can only generate a 2D image, the 3D displacement field is sliced and represented as a 2D mosaic. Since images and gradients are stored as 3D texture, the following equations can be used to map 2D coordinates in the displacement field mosaic into their corresponding 3D coordinates:

$$x = \mod\left(\frac{p}{R_x}\right)$$

$$y = \mod\left(\frac{q}{R_y}\right)$$

-continued
$$z = \text{fix}\left(\frac{p}{R_x}\right) + N \times \text{fix}\left(\frac{q}{R_y}\right),$$

where
(1) x, y and z are the 3D point coordinate to be found;
(2) p and q are the 2D point coordinate in the mosaic;
(3) fix is the quotient of the integer division; and
(4) mod is the remainder of the integer division.

The 3D field is needed to expand the displacement field by linear interpolation. The equations above can be inverted to convert the 3D displacement field to a 2D mosaic:

$$p = R_x \times \text{mod}\left(\frac{z}{N}\right) + x$$
$$q = R_y \times \text{fix}\left(\frac{z}{N}\right) + y,$$

where
(1) $R_x$ is the number of columns;
(2) $R_y$ is the number of rows;
(3) $R_z$ is the number of slices; and
(4) N is defined as:
   $N = \sqrt{R_z}$, if the result (i.e. $\sqrt{R_z}$) is an integer,
   $N = \sqrt{2 \times R_z}$, otherwise.

Note that since $R_z$ is of the form $R_z = 2^k$, and since N should be an integer, if sqrt($R_z$) yields a non-integer value, the sqrt ($2*R_z$) will be an integer.

To find the Laplacian of the displacement field, one needs to find the six immediate neighbors. The following equation can be used:

$$\Delta u_k(x, y, z) = \begin{array}{l} u_k(x+1, y, z) + u_k(x-1, y, z) + u_k(x, y+1, z) + \\ u_k(x, y-1, z) + u_k(x, y, z+1) + u_k(x, y, z-1) - \\ 6.0 \times u_k(x, y, x). \end{array}$$

But in 2D this last equation becomes, using the (p,q) coordinates previously defined:

$$\Delta u_k(p, q) = \begin{array}{l} u_k(p+1, q) + u_k(p-1, q) + u_k(p, q+1) + \\ u_k(p, q-1) + u_k(r, s) + u_k(t, u) - 6.0 \times u_k(p, q), \end{array}$$

where:

$$r = \text{mod}\left(\frac{x + R_x}{N \times R_x}\right); \quad (1)$$

$$s = y + R_y \times \text{fix}\left(\frac{x + R_x}{N \times R_x}\right); \quad (2)$$

$$t = \text{mod}\left(\frac{x - R_x + N \times R_x}{N \times R_x}\right); \quad (3)$$

$$u = y + R_y \times \text{fix}\left(\frac{x - R_x}{N \times R_x}\right). \quad (4)$$

For a 3D image, OpenGL automatically sets the boundary conditions to clamp to edge, in which texel values equals zero outside the texture domain. To deal with boundary conditions in the case of 2D displacement field mosaic, clamp to edge is also needed. Thus, points on the boundary of an image need to be treated differently from points on the inside of the image. The GPU has no knowledge of whether a point is a boundary point or is in the interior of the image. But, since the 3D displacement field has been decomposed into a 2D mosaic, a 2D mask can be used, according to an embodiment of the invention, to control the boundary conditions. The mask is precomputed for each grid point in the image, and is a vector composed of 7 coefficients (a,b,c,d,e,f,g) that multiply each term of the Laplacian equation, and determines if the current value should be included in the calculation of the Laplacian:

$a \times u_k(p+1,q) + b \times u_k(p-1,q) + c \times u_k(p,q+1) + d \times u_k(p,q-1) + e \times u_k(r,s) + f \times u_k(t,u) + g \times u_k(p,q)$ where
(1) a, b, c, d, e, f are either 0 or 1, with 0 indicating a point outside the boundary, and 1 a point inside the boundary; and
(2) g can vary between −6 and 0 depending on the number of nearest neighbor interior points about (p,q).

Experiments according to an embodiment of the invention have shown that the computation time of a PDE-based multi-resolution registration of two $256^3$ CT lung volumes (inspiration/expiration) can be as short as about 95 seconds. These experiments were performed using an NVIDIA GeForceFx 5600 AGP (256 MB of Memory) graphics card on a computer equipped with two Xeon 1.7 Ghz processors. This computation time is exemplary, and registration computations times may vary depending on the details of the registration algorithm implementation, and the GPU and CPU that were used. Since current graphic card memories are limited to 256 MB, the registration was completed on the GPU for volume sizes of $128^3$ voxels or less. A few iterations can be computed on the CPU at full resolution to refine the displacement field. The calculation of the gradient and the expansion of the displacement field can be performed by the CPU, while the calculation of the registration can be performed by the GPU. To ensure convergence of the algorithm, 80 iterations were performed for the lowest resolutions, 40 iteration for $128^3$, and 4 iterations for $256^3$.

Figure 7:
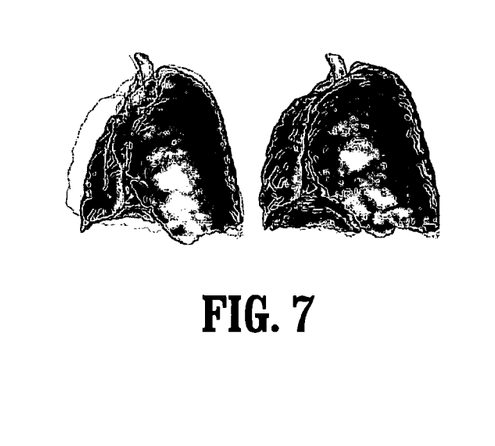
FIG. 7 is a surface rendering of an exemplary registration of two lung datasets, according to an embodiment of the invention.

A surface based rendering of registration results of the GPU accelerated registration are displayed in FIG. 7. Referring to the figure, the left image is a $256^3$ CT lung dataset with a large displacement before registration, and the right image is the $256^3$ CT lung dataset after registration.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
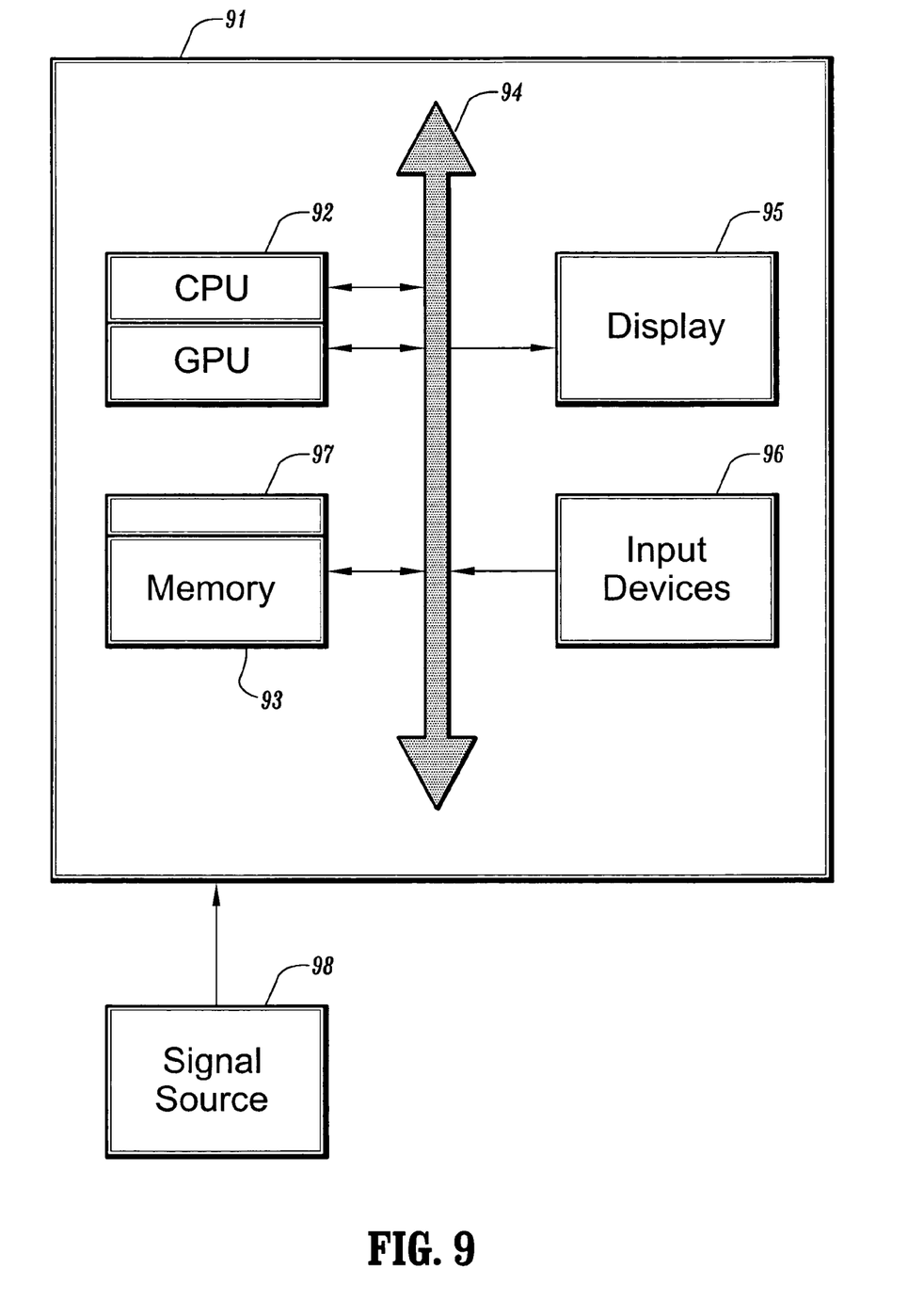
FIG. 9 is a block diagram of an exemplary computer system for implementing a GPU based image registration, according to an embodiment of the invention.

Referring now to FIG. 9, according to an embodiment of the present invention, a computer system 91 for implementing the present invention can comprise, inter alia, a central processing unit (CPU) 92, a graphics processing unit 99, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 and GPU 99 to process a signal from a signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of registering two images using a graphics processing unit, said method comprising the steps of:
    providing a pair of images with a first image and a second image, wherein said images comprise a plurality of intensities corresponding to a domain of grid points in a 3-dimensional space;
    calculating a gradient of the second image;
    initializing a displacement field on the grid point domain of the pair of images, wherein said displacement field transforms said second image into said first image;
    generating textures for the first image, the second image, the gradient, and the displacement field, and loading said textures into the graphics processing unit;
    creating a pixel buffer and initializing it with the texture containing the displacement field; and
    updating the displacement field in a rendering pass performed by the graphics processing unit according to the equation $u_{k+1} = u_k + \delta[(I_1 - I_2 \circ (\mathrm{Id} + u_k))\nabla I_2 \circ (\mathrm{Id} + u_k)] + \alpha \Delta u_k,$ wherein $u_k$ and $u_{k+1}$ are the displacement field and updated displacement field, respectively, $I_1$ is the first image, $I_2$ is the second image, $\nabla I_2$ is the gradient, Id is the identity map, $\nabla u_k$ is the Laplacian of the displacement field, $\alpha$ is a regularization parameter, and $\delta$ is the time step for one or more iterations,
    wherein the boundary conditions of the 3-dimensional displacement field are clamp-to-edge, and further comprising decomposing the 3-dimensional displacement field into a 2-dimensional displacement field and controlling said boundary conditions of the 2-D displacement field by imposing a 2D mask, wherein said mask is a precomputed vector comprising 7 coefficients (a,b,c,d,e,f,g) that multiply each term of the displacement field according to the equation, $a \times u_k(x+1,y) + b \times u_k(x-1,y) + c \times u_k(x,y+1) + d \times u_k(x,y-1) + e \times u_k(r,s) + f \times u_k(t,u) + g \times u_k(x,y),$ wherein $u_k(x,y)$ is the 2D displacement field, (a,b,c,d,e,f) are either 0 or 1, wherein 0 indicates a displacement field value outside the boundary, and 1 a point inside the boundary, g can vary between −6 and 0 depending on the number of nearest neighbor interior points about (x,y).

2. The method of claim 1, wherein creating a pixel buffer further comprises creating a rendering context, initializing the pixel buffer attributes, and generating a new texture where the pixel buffer is bound.

3. The method of claim 1, further comprising the steps of setting texture parameters, and setting uniform variables.

4. The method of claim 1, further comprising creating a rendering context for the image registration, and compiling and loading fragment programs for updating the displacement field into the graphics processing unit.

5. The method of claim 1, further comprising expanding the resolution of the displacement field after reading the displacement field from the pixel buffer.

6. The method of claim 5, wherein expanding the resolution includes linearly interpolating displacement field values for points between grid points in the displacement field domain.

7. The method of claim 1. wherein the domain of grid points is a 3-dimensional space. and wherein the displacement field is converted from 3 dimensions to 2 dimensions for the rendering pass according to the transformations $$p = R_x \times \mathrm{mod}\left(\frac{z}{N}\right) + x$$

$$q = R_y \times \mathrm{fix}\left(\frac{z}{N}\right) + y,$$

wherein fix is the quotient of an integer division, mod is the remainder of an integer division, (x, y, z) is a 3-dimensional grid point, (p, q) is a 2-dimensional grid point, $R_x$ is the number of columns, $R_y$ is the number of rows, and N is an integer defined as $N = \sqrt{R_z}$, if the result is an integer, $N = \sqrt{2 \times R_z}$, otherwise.

8. The method of claim 7, wherein the displacement field is converted from a 2-dimensional grid to a 3-dimensional grid according to the transformations $$x = \mathrm{mod}\left(\frac{p}{R_x}\right)$$

$$y = \mathrm{mod}\left(\frac{q}{R_y}\right)$$

$$z = \mathrm{fix}\left(\frac{p}{R_x}\right) + N \times \mathrm{fix}\left(\frac{q}{R_y}\right),$$

wherein $R_z$ is the number of slices.

9. The method of claim 1, wherein the Laplacian of the displacement field $U_k$ is defined in 3-dimensions as $\Delta u_k(x,y,z) = u_k(x+1,y,z) + u_k(x-1,y,z) + u_k(x,y+1,z) + u_k(x,y-1,z) + u_k(x,y,z+1) + u_k(x,y,z-1) - 6.0 \times u_k(x,y,x),$ and in 2-dimensions as $$\Delta u_k(p,q)=u_k(p+1,q)+u_k(p-1,q)+u_k(p,q+1)+u_k(p,q-1)+$$
$$u_k(r,s)+u_k(t,u)-60.0\times u_k(p,q),$$

wherein (x, y, z) is a 3-dimensional grid point, (p, q) is a 2-dimensional grid point, $R_x$ is the number of columns, $R_y$ is the number of rows, $R_z$ is the number of slices, and N is an integer defined as $N=\sqrt{R_z}$, if the result is an integer, $N=\sqrt{2\times R_z}$, otherwise, $$p = R_x \times \mathrm{mod}\left(\frac{z}{N}\right) + x$$

$$q = R_y \times \mathrm{fix}\left(\frac{z}{N}\right) + y,$$

$$r = \mathrm{mod}\left(\frac{x+R_x}{N\times R_x}\right),$$

$$s = y + R_y \times \mathrm{fix}\left(\frac{x+R_x}{N\times R_x}\right),$$

$$t = \mathrm{mod}\left(\frac{x-R_x+N\times R_x}{N\times R_x}\right),$$

$$u = y + R_y \times \mathrm{fix}\left(\frac{x-R_x}{N\times R_x}\right),$$

wherein fix is the quotient of an integer division and mod is the remainder of an integer division.

10. The method of claim 1, further comprising smoothing the displacement field and reading the updated displacement field from the pixel buffer.

11. A method of registering two images, said method comprising the steps of:
providing a graphics processing unit;
providing a pair of images with a first image and a second image, wherein said images comprise a plurality of intensities corresponding to a domain of grid points in a 3-dimensional space;
calculating a gradient of the second image;
initializing a displacement field on the grid point domain of the pair of images, wherein said displacement field transforms said second image into said first image;
generating textures for the first image, the second image, the gradient, and the displacement field, and loading said textures into the graphics processing unit;
creating a pixel buffer, including creating a rendering context, initializing the pixel buffer attributes, generating a new texture where the pixel buffer is bound and initializing it with the texture containing the displacement field:
updating the displacement field from a rendering pass performed by the graphics processing unit according to the equation $$u_{k+1}=u_k+\delta[(I_1-I_2\circ(\mathrm{Id}+u_k))\nabla I_2\circ(\mathrm{Id}+u_k)]+\alpha\Delta u_k,$$

wherein $u_k$ and $u_{k+1}$ are the displacement field and updated displacement field, respectively, $I_1$ is the first image, $I_2$ is the second image, $\nabla I_2$ is the gradient, Id is an identity map, $\Delta U_k$ is the Laplacian of the displacement field, $\alpha$ is a regularization parameter, and $\delta$ is the time step, wherein the Laplacian of the displacement field $u_k$ is defined in 3-dimensions as $$\Delta u_k(X,Y,Z)=u_k(X+1,y,z)+u_k(X,y+1,Z)+U_k(X,Y=1,Z)$$
$$+u_k(x,y,z+1)+u_k(x,y,z=1)=6.0\times u_k(x,y,x),$$

and in 2-dimensions as $$\Delta u_k(p,q)=u_k(p+1,q)+u_k(t,u)=6.0\times u_k(p,q),$$

wherein (x, y, z) is a 3-dimensional grid point, (p,q) is a 2-dimensional grid point, $R_x$ is the number of columns, $R_y$ is the number of rows, $R_z$ is the number of slices, and N is an integer defined as $N=\sqrt{R_z}$, if the result is an integer, $N=\sqrt{2\times R_z}$, otherwise, $$p = R_x \times \mathrm{mod}\left(\frac{z}{N}\right) + x$$

$$q = R_y \times \mathrm{fix}\left(\frac{z}{N}\right) + y,$$

$$r = \mathrm{mod}\left(\frac{x+R_x}{N\times R_x}\right),$$

$$s = y + R_y \times \mathrm{fix}\left(\frac{x+R_x}{N\times R_x}\right),$$

$$t = \mathrm{mod}\left(\frac{x-R_x+N\times R_x}{N\times R_x}\right),$$

$$u = y + R_y \times \mathrm{fix}\left(\frac{x-R_x}{N\times R_x}\right),$$

wherein fix is the quotient of an integer division and mod is the remainder of an integer division; and
expanding the resolution of the displacement field by linearly interpolating displacement field values for points between grid points in the displacement field domain.

12. The method of claim 11, further comprising smoothing the displacement field and reading the updated displacement field from the pixel buffer.

13. A program storage device readable by a computer, tangibly embodying a program of instructions executable by the computer to perform the method steps for registering two images using a graphics processing unit, said method comprising the steps of:
providing a pair of images with a first image and a second image, wherein said images comprise a plurality of intensities corresponding to a domain of grid points in a 3-dimensional space;
calculating a gradient of the second image;
initializing a displacement field on the grid point domain of the pair of images, wherein said displacement field transforms said second image into said first image;
generating textures for the first image, the second image, the gradient, and the displacement field, and loading said textures into the graphics processing unit;
creating a pixel buffer and initializing it with the texture containing the displacement field; and
updating the displacement field in a rendering pass performed by the graphics processing unit according to the equation $$u_{k+1}=u_k+\delta[(I_1-I_2\circ(\mathrm{Id}+u_k))\nabla I_2\circ(\mathrm{Id}+u_k)]+\alpha\Delta u_k,$$

wherein $u_k$ and $u_{k+1}$ are the displacement field and updated displacement field, respectively, $I_1$ is the first image, $I_2$ is the second image, $\nabla I_2$ is the gradient, Id is the identity map, $\Delta u_k$ is the Laplacian of the displacement field, $\alpha$ is a regularization parameter, and $\delta$ is the time step for one or more iterations,
wherein the boundary conditions of the 3-dimensional displacement field are clamp-to-edge, and further comprising decomposing the 3-dimensional displacement field into a 2-dimensional displacement field and controlling said boundary conditions of the 2-D displacement field by imposing a 2D mask, wherein said mask is a precomputed vector comprising 7 coefficients ( a,b,c,d,e,f, g) that multiply each term of the displacement field according to the equation, $$a\times u_k(x+1,y)+b\times u_k(x-1,y)+c\times u_k(x,y+1)+d\times u_k(x,y-1)+$$
$$e\times u_k(r,s)+f\times u_k(t,u)+g\times u_k(x,y),$$

wherein $u_k(x,y)$ is the 2D displacement field, (a,b,c,d,e,f) are either 0 or 1, wherein 0 indicates a displacement field value outside the boundary, and 1 a point inside the boundary, g can vary between −6 and 0 depending on the number of nearest neighbor interior points about (x,y).

14. The computer readable program storage device of claim 13, wherein creating a pixel buffer further comprises creating a rendering context, initializing the pixel buffer attributes, and generating a new texture where the pixel buffer is bound.

15. The computer readable program storage device of claim 14, wherein the method further comprising the steps of setting texture parameters, and setting uniform variables.

16. The computer readable program storage device of claim 13, wherein the method further comprises creating a rendering context for the image registration, and compiling and loading fragment programs for updating the displacement field into the graphics processing unit.

17. The computer readable program storage device of claim 13, wherein the method further comprises expanding the resolution of the displacement field after reading the displacement field from the pixel buffer.

18. The computer readable program storage device of claim 17, wherein expanding the resolution includes linearly interpolating displacement field values for points between grid points in the displacement field domain.

19. The computer readable program storage device of claim 14, wherein the domain of grid points is a 3-dimensional space, and wherein the displacement field is converted from 3 dimensions to 2 dimensions for the rendering pass according to the transformations $$p = R_x \times \mathrm{mod}\left(\frac{z}{N}\right) + x$$
$$q = R_y \times \mathrm{fix}\left(\frac{z}{N}\right) + y,$$

wherein fix is the quotient of an integer division, mod is the remainder of an integer division, (x, y, z) is a 3-dimensional grid point, (p, q) is a 2-dimensional grid point, $R_x$ is the number of columns, $R_y$ is the number of rows, and N is an integer defined as $N=\sqrt{R_z}$, if the result is an integer, $N=\sqrt{2 \times R_z}$, otherwise.

20. The computer readable program storage device of claim 19, wherein the displacement field is converted from a 2-dimensional grid to a 3-dimensional grid according to the transformations $$x = \mathrm{mod}\left(\frac{p}{R_x}\right)$$
$$y = \mathrm{mod}\left(\frac{q}{R_y}\right)$$
$$z = \mathrm{fix}\left(\frac{p}{R_x}\right) + N \times \mathrm{fix}\left(\frac{q}{R_y}\right),$$

wherein $R_z$ is the number of slices.

21. The computer readable program storage device of claim 13, wherein the Laplacian of the displacement field $u_k$ is defined in 3-dimensions as $$\Delta u_k(X,Y,Z) = u_k(X+1,y,z) + u_k(X,y+1,Z) + U_k(X,Y=1,Z) + u_k(x, y, z+1) + u_k(x, y, z=1) = 6.0 \times u_k(x, y, x),$$

and in 2-dimensions as $$\Delta u_k(p,q) = u_k(p+1,q) + u_k(p-1,q) + u_k(p,q+1) + u_k(p,q-1) + u_k(r,s) + u_k(t,u) - 60.0 \times u_k(p,q),$$

wherein (x, y, z) is a 3-dimensional grid point, (p, q) is a 2-dimensional grid point, $R_x$ is the number of columns, $R_y$ is the number of rows, $R_z$ is the number of slices, and N is an integer defined as $N=\sqrt{R_z}$, if the result is an integer, $N=\sqrt{2 \times R_z}$, otherwise, $$p = R_x \times \mathrm{mod}\left(\frac{z}{N}\right) + x$$
$$q = R_y \times \mathrm{fix}\left(\frac{z}{N}\right) + y,$$
$$r = \mathrm{mod}\left(\frac{x + R_x}{N \times R_x}\right),$$
$$s = y + R_y \times \mathrm{fix}\left(\frac{x + R_x}{N \times R_x}\right),$$
$$t = \mathrm{mod}\left(\frac{x - R_x + N \times R_x}{N \times R_x}\right),$$
$$u = y + R_y \times \mathrm{fix}\left(\frac{x - R_x}{N \times R_x}\right),$$

wherein is the quotient of an integer division and mod is the remainder of an integer division.

22. The computer readable program storage device of claim 13, further comprising smoothing the displacement field and reading the updated displacement field from the pixel buffer.

* * * * *